United States Patent [19]
Sato

[11] 3,771,436
[45] Nov. 13, 1973

[54] DEVICE FOR CUTTING AND WELDING PLASTIC BAND FOR USE IN AUTOMATIC STRAPPING MACHINE

[75] Inventor: Yoshimasa Sato, Kanagawa, Japan

[73] Assignee: Ikegai Tekko Kabushiki Kaisha, Tokyo, Japan

[22] Filed: Nov. 15, 1971

[21] Appl. No.: 198,855

[30] Foreign Application Priority Data
Dec. 26, 1970 Japan.............................. 45/140533
Dec. 26, 1970 Japan.............................. 45/140532

[52] U.S. Cl.............. 100/33 PB, 156/499, 156/502
[51] Int. Cl............................................. B65b 13/32
[58] Field of Search................... 100/25, 26, 33 PB; 53/3, 39, 329, 198 156/306, 499, 502

[56] References Cited
UNITED STATES PATENTS
3,470,814  10/1969  Tschappu....................... 100/33 PB
3,200,028  8/1965  Chisholm......................... 100/33 PB
3,269,300  8/1966  Billett et al...................... 100/33 PB
3,368,323  2/1968  Wood.............................. 100/33 PB Primary Examiner—Billy J. Wilhite
Attorney—Woodhams et al.

[57] ABSTRACT

A device for cutting and welding a plastic band for use in an automatic strapping machine, which comprises: a table provided with a cutting and welding mechanism thereunder; an upper band holding member which is supposed to hold the tip of the strapping band when said band is completely fed to cover the full length of the bottom of the table; a lower band holding member having a projection, which is disposed under the upper band holding member; and pectinate heat blades which are supposed to melt and penetrate the overlapped two portions of the band and thereafter weld them by the energy of a press member.

7 Claims, 17 Drawing Figures

PATENTED NOV 13 1973

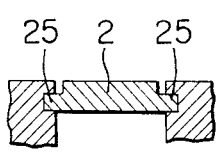
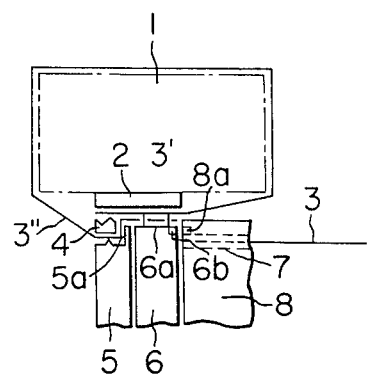
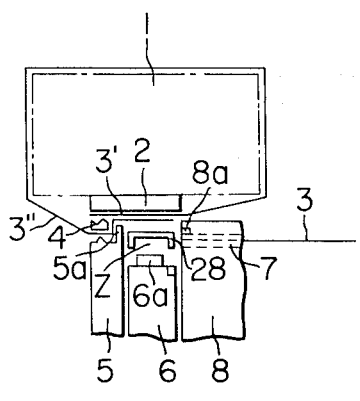
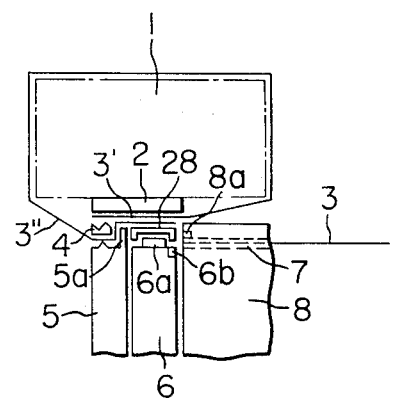
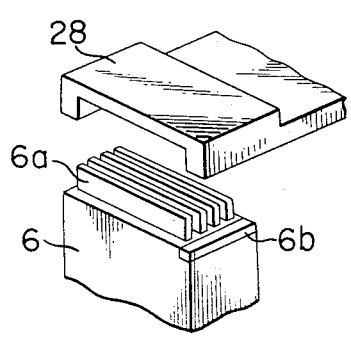
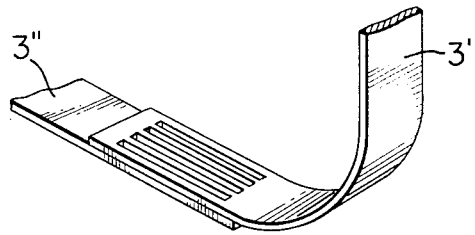

DEVICE FOR CUTTING AND WELDING PLASTIC BAND FOR USE IN AUTOMATIC STRAPPING MACHINE

BACKGROUND OF THE INVENTION a. Field of the Invention

The present invention relates to a device for cutting and welding a strapping band made of a thermoplastic material such as polypropylene, which is applicable to an automatic strapping machine for use in strapping the package by employing said strapping band.

b. Description of the Prior Art

As for the device for cutting and welding the strapping band according to the conventional automatic strapping machine, the sequence of working thereof is as diagrammatically summarized in FIGS. 1 – 5 of the appended drawings:

As shown in FIG. 1, the package 41 is placed on the table 42, the band 43 is wound round both the package 41 and the table 42, and the band holding member 44 holds the band 43 by pressing it against the table 42.

Next, as shown in FIG. 2, the band holding member 45 holds the band 43 by pressing it against the table 42.

Then, as shown in FIG. 3, the heat plate 46 is inserted into the interstice X formed by the band 43.

Subsequently, as shown in FIG. 4, the press member 47 ascends, cuts the band 43 by the cutter 47a thereof together with the cutter 44a of the band holding member 44, and thereafter presses the band 43 and the heat plate 46 against the table 42, thereby melting the surface of the band 43 contacting with the heat plate 46.

After that, as shown in FIG. 5, the heat plate 46 is removed and the melted portions of the surface of the band 43 are pressed to adhere to each other, whereby the strapping work is completed.

Then, the table 42 is pulled out and the package 41 comes to be strapped by virtue of the elasticity of the band 43.

The foregoing conventional device, however, is defective in that it cannot afford a tightly bound state of strapping when dealing with a small-sized package, and this defect is ascribable to the fact that the band holding member 44, the press member 47 and the band holding member 45 of the cutting and welding mechanism beneath the table 42 are placed in a row and the width of the table 42 cannot be made smaller than the total width of these members, so that there inevitably occur interstices which bring about the looseness of strapping when the table 42 is pulled out.

SUMMARY OF THE INVENTION

One object of the present invention is to provide a device which can eliminate the foregoing defect of the conventional devices and is capable of tightly strapping even a small-sized package on account of the contracted width of the table employed therefor.

Another object of the present invention is to provide a device having the band holding members arranged vertically as against the conventional way of transversely arranging them in a row beneath the table, which renders it possible to contract the width of the table by the width of one of these holding members and to minimize the occurrence of interstices between the band and the exterior of a package even when said package is of small size, thereby bringing about tight strapping of the package.

Still another object of the present invention is to provide a device wherein the heat blade to melt the band is installed on the top of the heat member disposed under the table and capable of vertical movement and is so designed as to be pressed into the band exactly at a right angle to thereby render a stable and firm welding portion and, at the same time, minimize the risk of damaging the heat blade.

BRIEF DESCRIPTION OF THE DRAWINGS

Among the appended drawings.

FIG. 12 is a diagrammatic longitudinal section of the table in relation to the mechanism for holding thereof employed in the same embodiment as above.

FIGS. 13 – 15 are diagrammatic front views of the same embodiment as above, wherein the state of working of the device is illustrated in due order.

FIG. 16 is a diagrammatic perspective view to show the relative position of the heat member and the press member.

FIG. 17 is a diagrammatic perspective view to show the state of the band welded.

DETAILED DESCRIPTION OF THE INVENTION

Figure 1:
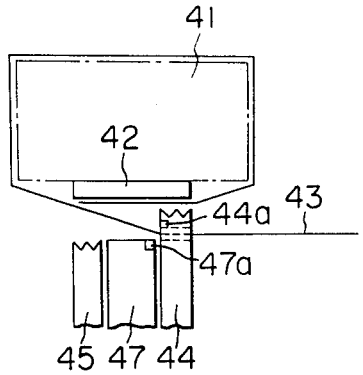
FIGS. 1 – 5 are diagrammatic front views of the principal parts of the cutting and welding device for the conventional automatic strapping machine, wherein the state of working of said device is illustrated in due order.
Figure 2:
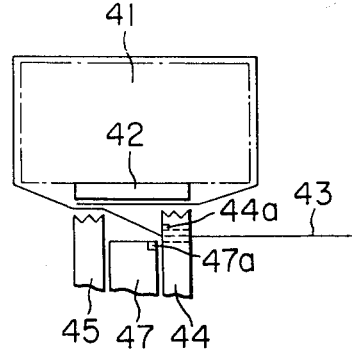
Figure 3:
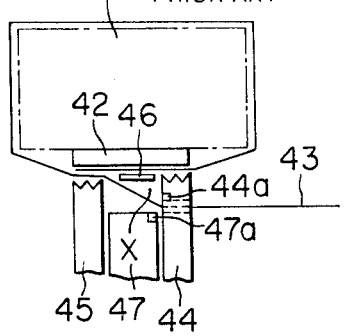
Figure 4:
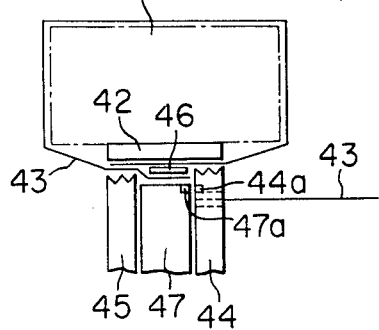
Figure 5:
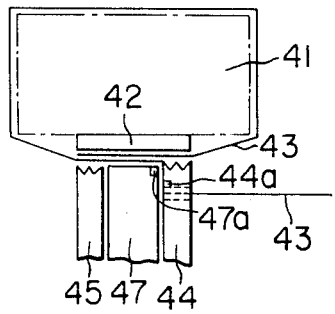
Figure 6:
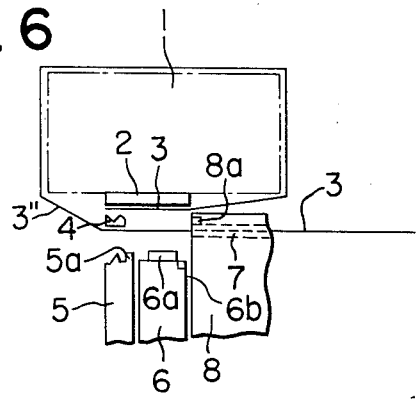
FIG. 6 is a diagrammatic front view of the principal part of the device according to the present invention.

In FIG. 6, the package 1 is placed on the table 2, the band 3 fed through the opening 7 of the guide member 8 winds round the package 1 together with the table 2, and the upper band holding member 4 holds the tip 3' of the band 3 by pressing it against the table 2.

Figure 7:
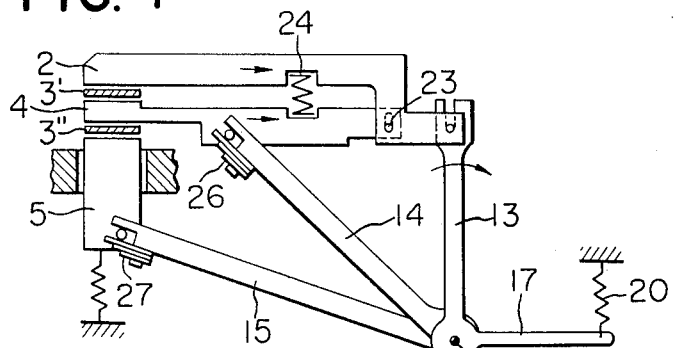
FIG. 7 is an illustration of the working mechanism of the table employed in the same embodiment as shown in FIG. 6.
Figure 8:
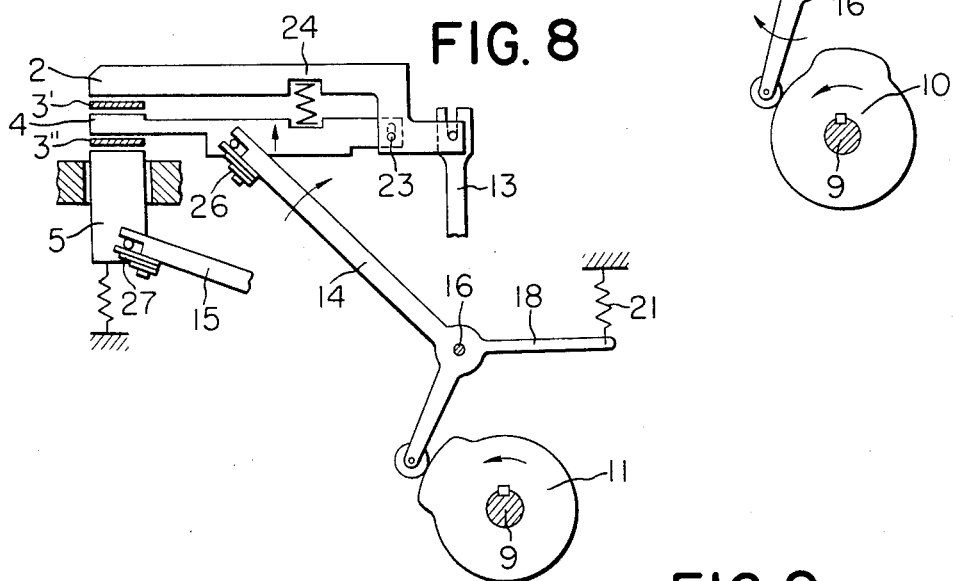
FIG. 8 is an illustration of the working mechanism of the upper band holding member employed in the same embodiment as above.
Figure 9:
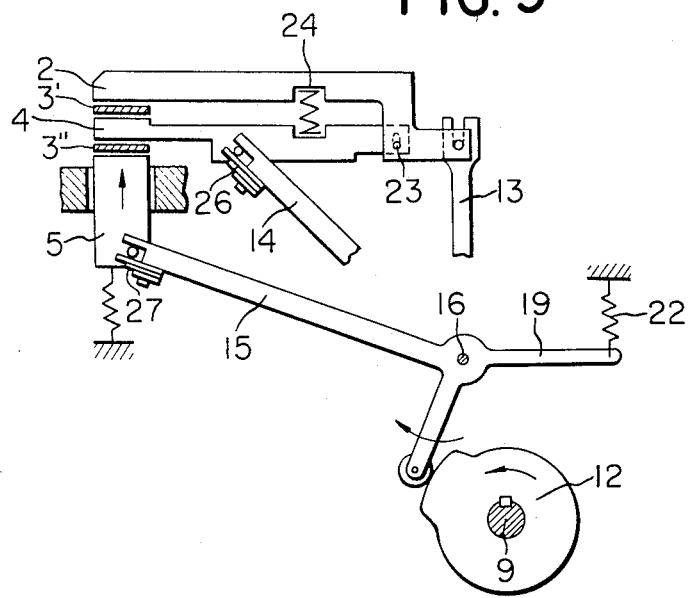
FIG. 9 is an illustration of the working mechanism of lower band holding member employed in the same embodiment as above.

The working mechanism of the table 2, the upper band holding member 4 and the lower band holding member 5 in the present device is as shown in FIGS. 7 through 9. To be precise, the drive shaft 9 pivoted on the frame of machine is provided with the cams 10, 11 and 12 fixed thereon. The levers 13, 14 and 15 to work by virtue of these cams are pivoted on the supporting shaft 16, and the tips of these levers are respectively engaged with the pin provided respectively on the table 2, the upper band holding member 4 and the lower band holding member 5 by means of their forked projection. The arms 17, 18 and 19 branching out from these levers are engaged with the frame of machine by means of the springs 20, 21 and 22, respectively. The table 2 and the upper band holding member 4 are connected with each other by means of the pin 23 and also provided with the spring 24 interposed therebetween.

The table 2 is constructed by fitting the projections 25 provided on both sides thereof into the grooves provided on the frame of machine as shown in FIG. 12. The top of the lower band holding member 5 is provided with the projection 5a (FIG. 14) so disposed as to be located by the side of the upper band holding member 4 with the ascent of the lower band holding member 5. Parallel to these band holding members 4 and 5, there are provided the heat member 6 whose top is equipped with the pectinate heat blades 6a disposed parallel to the direction of the band and the press member 28 disposed above the heat member 6 and having a width practically the same as that of said heat member 6. The width of the table 2 is almost equal to the total of the width of the lower band holding member 5 and the width of the press member 28, to wit, the heat member 6. The reference 8 denotes the guide member which is provided with the cutter 8a, and 26 and 27 each denotes a leaf spring provided for impact absorption purposes.

Figure 10:
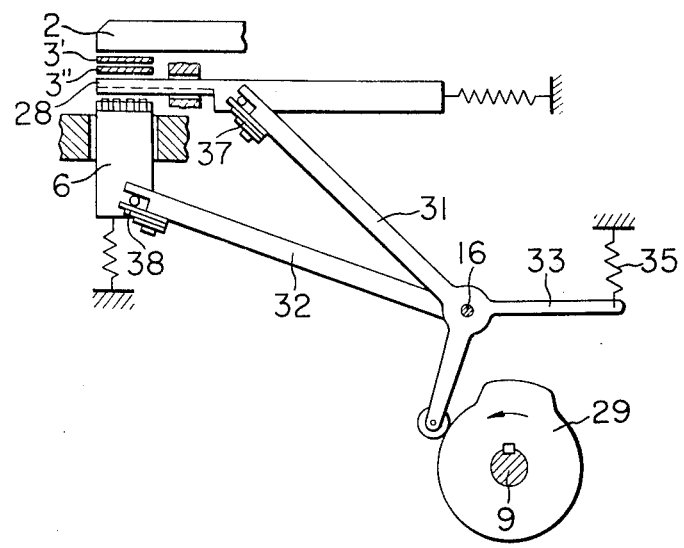
FIG. 10 is an illustration of the working mechanism of the press member employed in the same embodiment as above.
Figure 11:
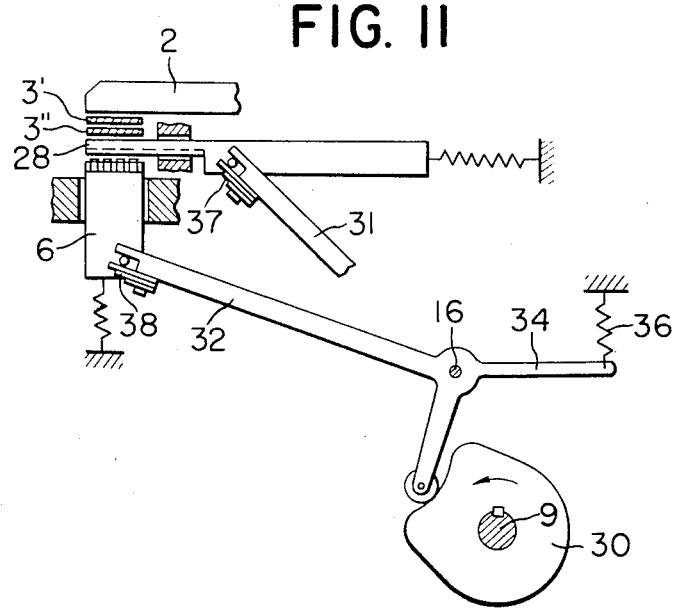
FIG. 11 is an illustration of the working mechanism of the heat member employed in the same embodiment as above.

The working mechanism of the heat member 6 and the press member 28 in the foregoing device is as shown in FIGS. 10 and 11. That is, these members work by virtue of the cams 29 and 30 fixed on the drive shaft 9, the tips of the levers 31 and 32 pivoted on the supporting shaft 16 are respectively engaged with the pin provided respectively on the press member 28 and the heat member 6 by means of their forked projection, and the arms 33 and 34 branching out from these levers are engaged with the frame of machine by means of the springs 35 and 36, respectively. The numeral references 37 and 38 each denotes a leaf spring provided for impact absorption purposes.

OPERATION

In the state shown in FIG. 6, the levers 13 and 14 to work on the table 2 and the upper band holding member 4 are engaged with the cams 10 and 11 as shown in FIGS. 7 and 8, respectively.

At this, when the drive shaft 9 rotates and the lever 15 is engaged with the cam 12 as shown in FIG. 9, the lever 15 turns clockwise centering around the supporting shaft 16 and the lower band holding member 5 ascends to press the lower portion 3'' of the band 3 by its top against the bottom surface of the upper band holding member 4 and also hold the band 3' by pressing it against the bottom surface of the table 2 by the top of the projection 5a.

At the same time, the lever 32 shown in FIG. 11 turns clockwise centering around the supporting shaft 16 by virtue of the cam 30, whereby the heat member 6 is elevated and the band 3 is cut by the energy of the cutter 6b provided on one shoulder of said heat member 6 and the cutter 8a provided on the shoulder of the opening of the guide member 8, and thereafter the heat blades 6a equipped on the top of the heat member 6 press the upper portion 3' and the lower portion 3'' of the band against the bottom surface of the table 2 to melt and penetrate the thus overlapped portions 3' and 3'' of said band (cf. FIG. 13).

Subsequently, the lever 32 turns counterclockwise centering around the supporting shaft 16 by virtue of the cam 30, whereby the heat member 6 descends and there is brought about the interstice Z between the heat member 6 and the lower portion 3'' of the band as shown in FIG. 14.

At this juncture, the lever 31 shown in FIG. 10 turns counterclockwise centering around the supporting shaft 16 by virtue of the cam 29, whereby the press member 28 is made to advance into said interstice Z (cf. FIG. 14).

Thereafter, the lever 32 turns clockwise again by virtue of the cam 30 and the heat member 6 ascends to thereby push up the bottom surface of the press member 28 by the heat blades 6a equipped on the top thereof (cf. FIG. 16), press the melted portions 3' and 3'' of the band by the top surface thereof against the bottom surface of the table 2, and weld the band by said melted portions to complete the strapping work (cf. FIG. 15).

The condition of the thus welded portions of the band is as shown in FIG. 17.

Although particular preferred embodiments of the present invention have been disclosed hereinabove for the purpose of illustration, it will be understood that variations or modifications thereof which lie within the scope of the invention as defined by the appended claims are fully contemplated.

What is claimed is:

1. A device for cutting and welding a plastic band applicable to an automatic strapping machine for the purpose of strapping the package with a thermoplastic band, which is characterized by the provision of a table capable of longitudinal movement under the package, an upper band holding member installed beneath one side of said table so as to cooperate therewith and be capable of vertical movement in relation thereto, a press member installed beneath the other side of said table so as to be capable of longitudinal movement, a lower band holding member installed beneath said upper band holding member so as to be capable of vertical movement, a heat member installed beneath said press member so as to be capable of vertical movement, said heat member being provided with plural heat blades disposed parallel to the direction of strain of said band, and means for cutting cutting said band.

2. A device for cutting and welding a plastic band as defined in claim 1, wherein the width of said table is almost equal to the total of the width of said lower band holding member and the width of said heat member.

3. An apparatus for welding the overlapping end portions of an elongated thermoplastic strapping band, such as for securing said band in surrounding relationship to a package, comprising:

a movable table adapted to have a package positioned thereon;

a first band holding member positioned beneath said table and means mounting said first holding member for vertical movement for permitting one of said end portions of said band to be clamped between said table and said first holding member;

a second band holding member disposed below said first band holding member and means mounting said second holding member for vertical movement toward said first holding member for permitting the other end portion of said band member to be clamped between said first and second holding members;

heating means disposed below said table and means mounting same for movement toward and away from said table, said heating means including a heating head disposed for engaging and melting the overlapping end portions of said band, whereby movement of said heating means toward said table causes the overlapping end portions of said band means to be positioned between said table and said heating head; and a pressing member disposed below said table and means mounting said pressing member for substantially horizontal movement between a first position wherein said pressing member is disposed between the heating head and the overlapping end portions of said band and a second position wherein said pressing member is laterally spaced from said first position, whereby upward movement of said heating means when said pressing member is in said first position causes said pressing member to cover said heating head so that said pressing member causes the previously heated overlapping end portions of said band to be pressed against the undersurface of said table.

4. An apparatus according to claim 3, further including means coacting with said table for moving same horizontally for permitting said table to be withdrawn from between said package and the overlapping portions of said band;

said first band holding member comprising a lever pivotally mounted on said table and disposed for swinging movement within a substantially vertical plane, said lever being horizontally movable with said table portion, said lever having a band engaging portion disposed thereon adjacent the free end thereof; and spring means coacting between said lever and said table for normally maintaining said band engaging portion spaced from the undersurface of said table.

5. An apparatus according to claim 4, wherein the movement of said table, said second band holding member, said heating means and said pressing member are individually controlled by means of a plurality of swingable driving levers, and a plurality of rotatable drive cams respectively disposed in driving engagement with said driving levers for controlling the movement thereof.

6. An apparatus according to claim 4, wherein said heating head includes a plurality of elongated and substantially parallel blades which at least partially penetrate and melt the overlapping end portions of said band, and wherein said pressing member includes a caplike portion which covers said blades when said pressing member is in said first position.

7. An apparatus according to claim 3, wherein said heating head includes a plurality of elongated and substantially parallel blades which are adapted to at least partially penetrate and melt the overlapping end portion of said band, said blades extending in a direction substantially parallel to the direction of strain of said band.

* * * * *